United States Patent
Wallace et al.

(10) Patent No.: US 7,123,747 B2
(45) Date of Patent: Oct. 17, 2006

(54) ENHANCEMENT OF VEHICLE INTERIOR DIGITAL IMAGES

(75) Inventors: Jon K. Wallace, Redford, MI (US); Farid Khairallah, Farmington Hills, MI (US); Barry Dunbridge, Torrance, CA (US); John J. Berenz, San Pedro, CA (US)

(73) Assignee: TRW Inc., Lyndhurst, OH (US)

( * ) Notice: Subject to any disclaimer, the term of this patent is extended or adjusted under 35 U.S.C. 154(b) by 517 days.

(21) Appl. No.: 10/156,592

(22) Filed: May 28, 2002

(65) Prior Publication Data

US 2003/0223617 A1   Dec. 4, 2003

(51) Int. Cl.
*G06K 9/00* (2006.01)

(52) U.S. Cl. .................. 382/104; 348/148; 701/117

(58) Field of Classification Search ........... 382/100, 382/104, 254, 263, 266, 291; 340/825.72, 340/435, 438; 701/28, 45, 46, 119, 117; 348/148, 143; 702/142, 143, 149, 155
See application file for complete search history.

(56) References Cited

U.S. PATENT DOCUMENTS

| | | | |
|---|---|---|---|
| 4,541,016 A | 9/1985 | Ochi et al. | |
| 5,726,705 A * | 3/1998 | Imanishi et al. | 348/92 |
| 5,729,640 A | 3/1998 | Castonguay | |
| 6,058,339 A * | 5/2000 | Takiguchi et al. | 701/28 |
| 6,150,930 A * | 11/2000 | Cooper | 340/435 |
| 6,252,536 B1 | 6/2001 | Johnson et al. | |
| 6,498,620 B1 * | 12/2002 | Schofield et al. | 348/148 |
| 6,507,779 B1 * | 1/2003 | Breed et al. | 701/45 |
| 6,584,342 B1 * | 6/2003 | Trushin et al. | 600/476 |
| 6,681,195 B1 * | 1/2004 | Poland et al. | 702/142 |

\* cited by examiner

*Primary Examiner*—Jingge Wu
*Assistant Examiner*—Abolfazl Tabatabai
(74) *Attorney, Agent, or Firm*—Tarolli, Sundheim, Covell & Tummino LLP

(57) ABSTRACT

A method for helping to control a vehicle occupant protection device (22) includes taking an image of the vehicle interior with a digital imager (50) having an array of pixels (53). A contiguous portion of the image less than the entire image is selected. At least one image enhancement technique is applied to the selected image portion. The enhanced image portion is combined with the other portions of the image to make an enhanced image. The enhanced image is analyzed to detect at least one of features and characteristics of the enhanced image. Alternatively, a selected non-contiguous group of the pixels (53) of the imager (50) are read out, as representative of the entire image, to estimate the illumination levels across the entire array of pixels. In one aspect, the imager shutter (56) speed may be controlled to enhance the image.

15 Claims, 4 Drawing Sheets

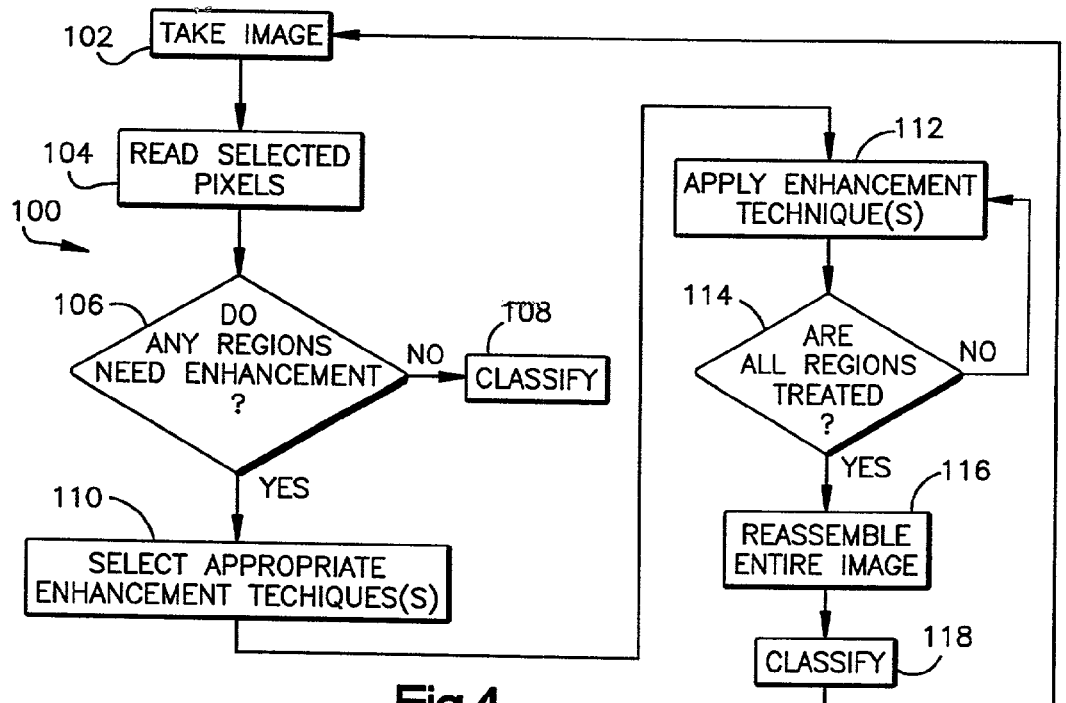
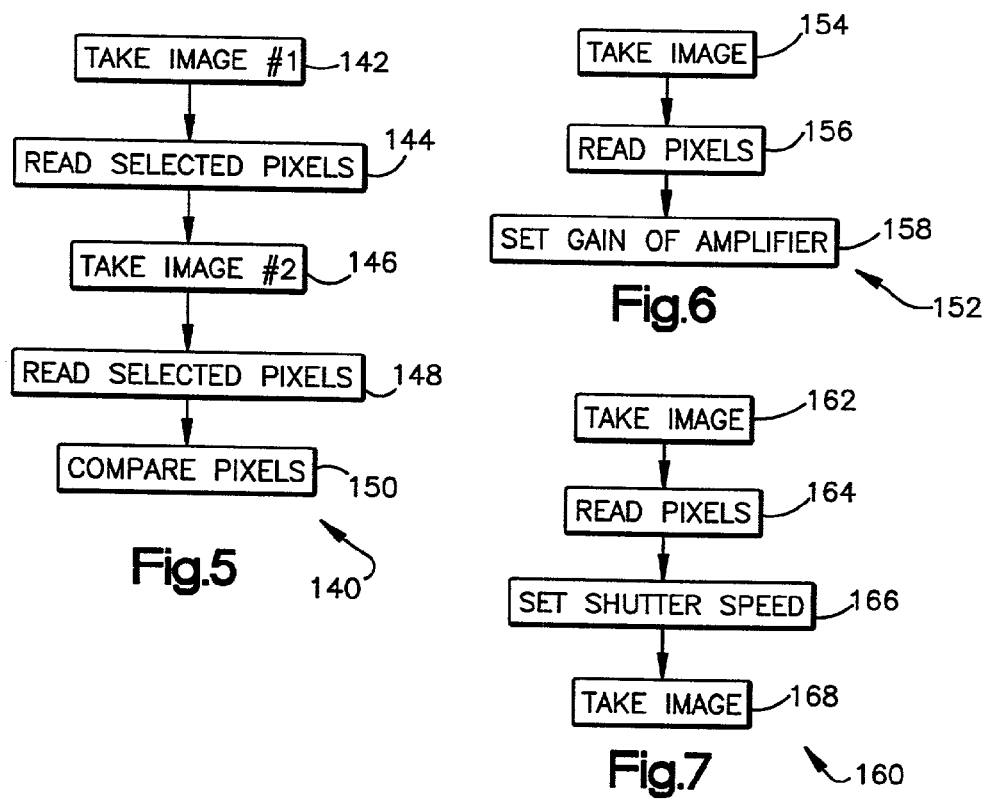

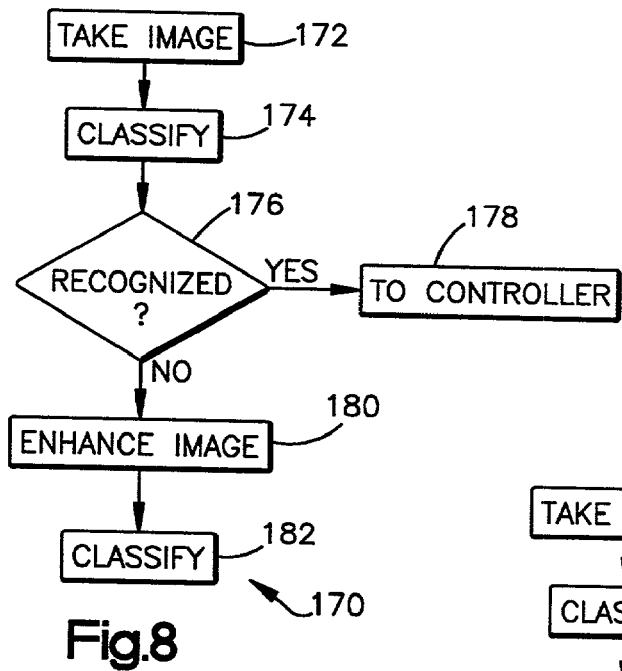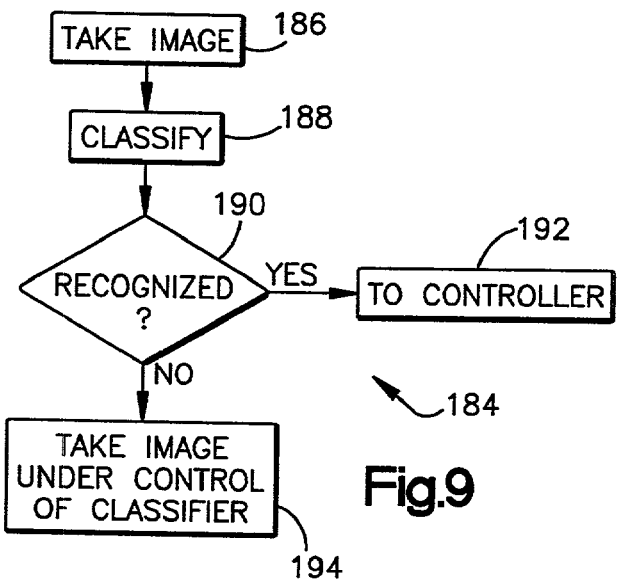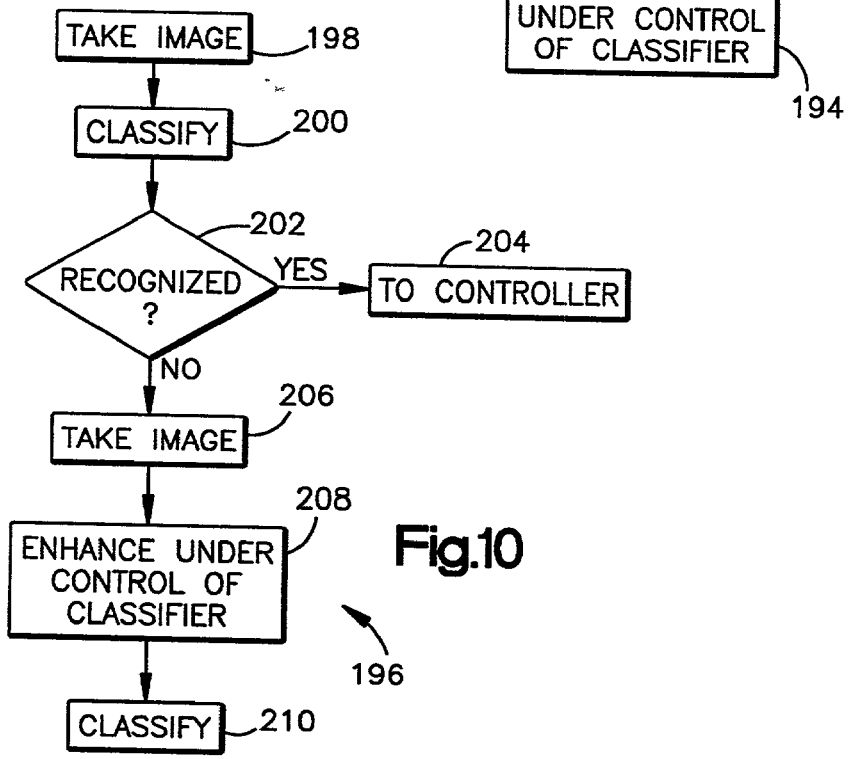

ENHANCEMENT OF VEHICLE INTERIOR DIGITAL IMAGES

BACKGROUND OF THE INVENTION

1. Technical Field

The present invention relates to image analysis and image enhancement. In particular, the present invention relates to the analysis and enhancement of images taken of a vehicle interior for the purpose of helping to control a vehicle occupant protection device.

2. Description of the Prior Art

It is known to take images of a vehicle interior for the purpose of helping to control a vehicle occupant protection device. For example, it is known to take an image of the area of a vehicle seat, to help decide whether to actuate a vehicle occupant protection device. If the seat is determined to be empty, the device (for example, an air bag) may not be actuated; or, if it is determined that there is a child or a child seat present on the vehicle seat, the device may not be actuated.

It is known to use a charge coupled device (CCD) imager to take such images of a vehicle interior, and to direct the output of the imager, a set of pixel values, into a classifier to process the images.

SUMMARY OF THE INVENTION

In accordance with one aspect, the present invention includes a method for helping to control a vehicle occupant protection device. An image is taken of the vehicle interior with a digital imager having an array of pixels. A contiguous portion of the image is selected that is less than the entire image. At least one image enhancement technique is applied to the selected portion of the image. The enhanced image portion is combined with the other portions of the image to make an enhanced image. The enhanced image is analyzed to detect at least one of features and characteristics of the enhanced image.

In accordance with one aspect, the present invention includes a method for helping to control a vehicle occupant protection device. An image is taken of the vehicle interior with a digital imager having an array of pixels. A selected non-contiguous group of the pixels of the imager are read out, that are representative of the entire image, to estimate the illumination levels across the entire array of pixels. The image is analyzed to detect at least one of features and characteristics of the image. Operation of the vehicle occupant protection device is controlled on the basis of the image analysis.

In accordance with one aspect, the present invention includes a method for helping to control a vehicle occupant protection device. A first image of the vehicle interior is taken with a digital imager having an array of pixels and set at a first shutter speed. At least a portion of the pixels of the imager are read out to determine illumination levels of the image. The shutter speed of the imager is changed from the first shutter speed to a second shutter speed. A second image of the vehicle interior is taken with the digital imager set at a second shutter speed. The second image is analyzed to detect at least one of features and characteristics of the image. Operation of the vehicle occupant protection device is controlled on the basis of the image analysis.

BRIEF DESCRIPTION OF THE DRAWINGS

The foregoing and other features and advantages of the present invention will become more apparent to one skilled in the art upon consideration of the following description of the invention and the accompanying drawings, in which:

FIG. 4 is a flow chart showing a control process used in the image enhancement system of FIG. 1;

FIG. 5 is a flow chart showing a first alternative control process used in the image enhancement system of FIG. 1;

FIG. 6 is a flow chart showing a second alternative control process used in the image enhancement system of FIG. 1;

FIG. 7 is a flow chart showing a third alternative control process used in the image enhancement system of FIG. 1;

FIG. 8 is a flow chart showing a fourth alternative control process used in the image enhancement system of FIG. 1;

FIG. 9 is a flow chart showing a fifth alternative control process used in the image enhancement system of FIG. 1; and FIG. 10 is a flow chart showing a sixth alternative control process used in the image enhancement system of FIG. 1.

DESCRIPTION OF THE INVENTION

Figure 1:
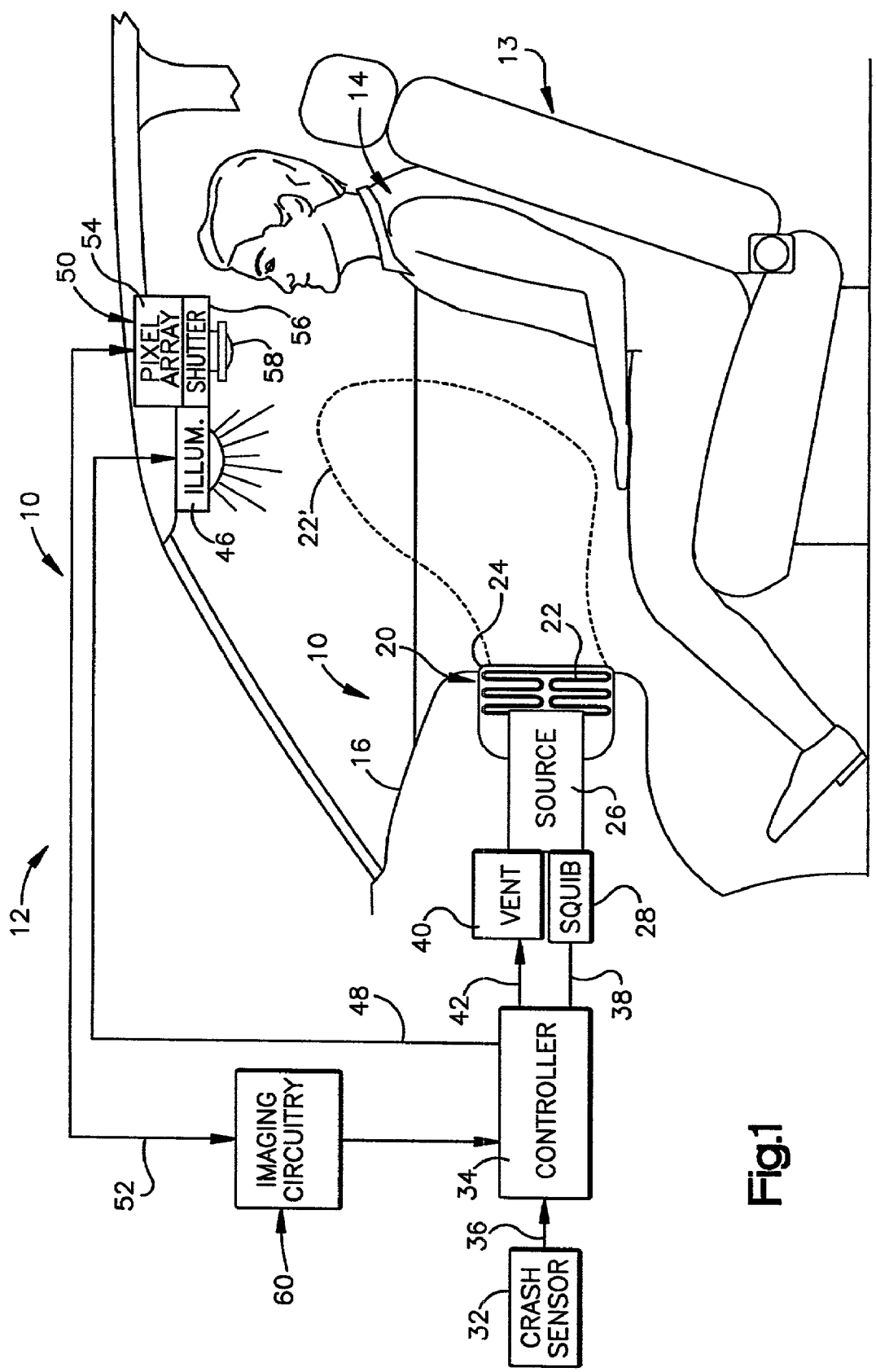
FIG. 1 is a schematic illustration of a portion of a vehicle that includes an imager and an image enhancement system in accordance with the present invention.

The present invention relates to image analysis and image enhancement. In particular, the present invention relates to the analysis and enhancement of images taken of a vehicle interior. Such a system may be used for the purpose of helping to control a vehicle occupant protection device. The present invention is applicable to various image enhancement systems. As representative of the present invention, FIG. 1 illustrates schematically an image enhancement system incorporated in a vehicle 12.

The vehicle 12 includes a vehicle seat 13 on which there is shown seated a vehicle occupant 14. The vehicle also has an instrument panel 16 located forward of the seat.

The occupant protection system 10 includes an air bag module 20. An air bag 22 of the module 20 is folded and stored within a housing 24 of the module. The housing 24 is mounted within the instrument panel 16 of the vehicle 12.

The module 20 includes a source 26 of inflation fluid (e.g., gas) to inflate the air bag to a deployed state (shown in phantom at 22'). In the illustrated example, the inflation fluid source 26 includes a pyrotechnic material that is ignited by a squib 28. Combustion of the pyrotechnic material generates gas (e.g., nitrogen gas). In an alternative embodiment, the inflation fluid source 26 can be a pressurized container of gas, with the squib 28 opening the container thereby to discharge gas into the air bag 22.

A crash sensor 32 is included within the occupant protection system 10 to sense a vehicle crash event and output a signal indicative thereof. The crash sensor 32 may take any suitable form, such as an acoustic crash sensor, inertia switch or an accelerometer that outputs a signal indicative of a crash condition, such as crash acceleration or other crash metric. A controller 34 is operatively connected 36 to receive the signal from the crash sensor 32. The signal output by the crash sensor 32 is used in a crash algorithm to determine if a deployment crash event is occurring.

The controller 34 controls actuation of the air bag module 20. In the illustrated example, the controller 34 is operatively connected 38 to the squib 28 to provide an actuating (ignition) signal to the squib. The controller 34 is typically a microcomputer or microprocessor. Alternatively, the functions of the controller 34 may be provided by one or more digital and/or analog circuits. Also, the controller 34 may be provided within an application specific integrated circuit.

The controller 34 controls the timing, rate, and degree of air bag inflation in any of a number of ways. In the illustrated example, the deployment is adjustable or tailorable via use of a vent device 40 that is connected to the housing 24 and/or the air bag 22. The vent device 40 may take any of a variety of forms, such as an electrically controlled regulator or valve that responds to a control signal, in a known manner.

Another function of the controller 34 is to make determinations regarding the presence and/or position of an occupant 14 as part of the occupant sensing system, in accordance with the present invention. The determinations of the presence and/or position of an occupant 14 are based upon sensory information and are used to control the actuation/adjustment of the air bag 22.

As part of the structure for obtaining sensory information regarding the presence and/or position of an occupant, an illuminating element 46 is located within the interior of the vehicle 12. The illuminating element 46 is operatively connected 48 to the controller 34 and illuminates the interior of the vehicle in response to a control signal provided by the controller 34. The illuminating element 46 may, in one embodiment, only illuminate the interior of the vehicle 12 when it is turned on or activated by the controller 34. Any suitable type of illuminating element can be used. For example, the illuminating element 46 may be a strobe type of light that operates near or in the infrared range such that illumination from the illuminating element is not visible to human vision. The illuminating element 46 may be configured or programmed to strobe or flash on and off at a predetermined rate such that its activation and deactivation is independent of the control signal issued by the controller 34.

An image sensor or imager 50 is located within the interior of the vehicle 8 and is operatively connected 52 to the controller 34 through imaging circuitry 60. The imager 50 may be any type of digital sensor suitable for acquiring an image of the interior of the vehicle 12. For instance, the imager 50 may take the form of a CCD (charge coupled device) imager or a CMOS-type device.

Figure 2:
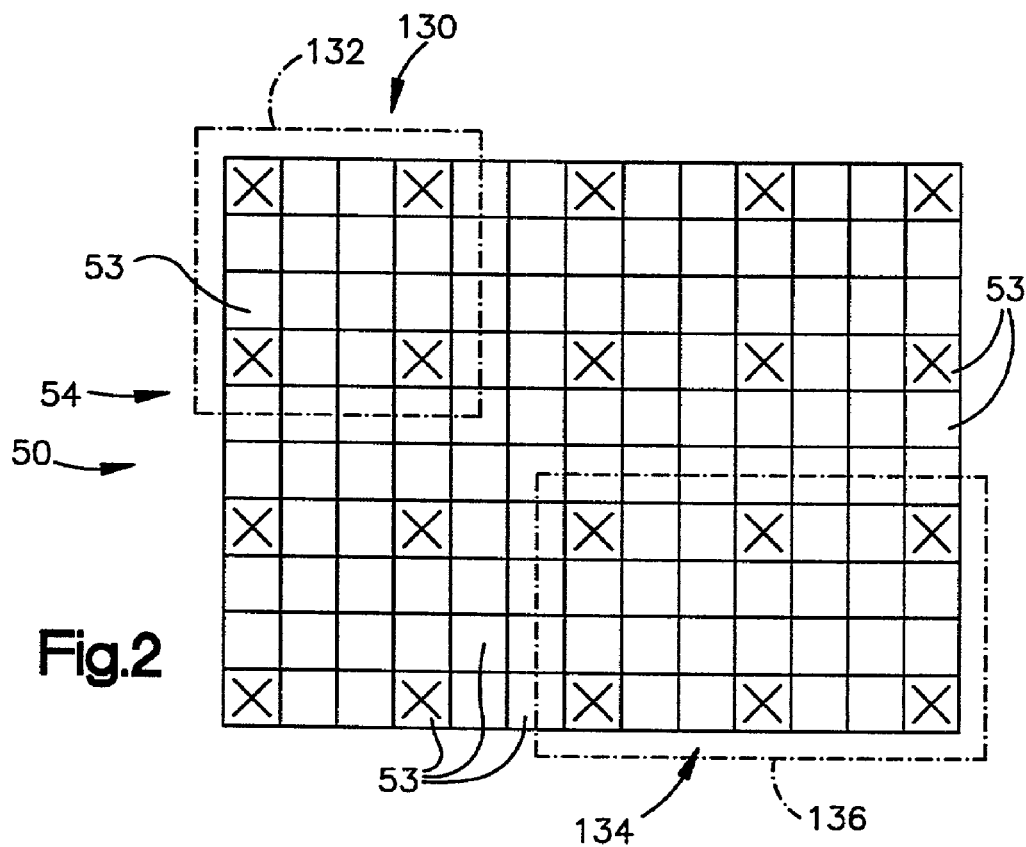
FIG. 2 is a schematic representation showing of a portion of the imager of FIG. 1.

The imager has a plurality of pixels 53 (FIG. 2) arranged in an array 54 (FIGS. 1 and 2), for acquiring pixilated images of the interior of the vehicle. FIG. 2 illustrates schematically a small portion of the total array 54 of the imager, in which each one of the squares in FIG. 2 represents one pixel 53 of the array. The number of pixels 53 in the array 54 is actually substantially more, for example, one million or more. The imager 50 also includes a shutter 56.

When the array of pixels 54 is illuminated, light falls on each pixel 53, in varying amounts dependent on the image being obtained-that is, the image intensity varies across the array over the lighter and darker areas of the image. Each pixel 53 outputs a value indicative of the intensity of the light falling on that pixel-the number of photons. The brighter the light at a pixel location 53, the more photons hit the pixel, and the greater its value. Thus, the electronic output state of a pixel 53 is representative of the intensity of the light falling on that pixel.

The bit depth at each pixel 53 of the array 54 relates to the number of states the pixel can have. For example, a one bit pixel is, electrically, either on or off, and can only be read as "black" or "white" in an image. A two bit pixel can have four states-00, 01, 10, or 11. Thus, it can show any one of four different values, including two gray levels between black and white. In the particular array 54 of the illustrated embodiment, each pixel 53 is a 12-bit pixel, and can have up to 4096 charge thresholds or states. That is, each pixel 53 can report out $2^{12}$ (4,096) different levels of light intensity.

The imager 50 is situated so that it can acquire an image of the interior of the vehicle 12 at the location intended for the occupant 14 (e.g., the seat 13). The illuminating element 46 is situated within the interior of the vehicle 12 such that it illuminates the portion of the interior of the vehicle to substantially coincide with the field of view of the imager 50. In the example illustrated, because the image sensor 50 is located at an overhead location in front of the occupant 14, the seat 13 is within the field of view of the imager 50.

The shutter 56 is controllable and has different shutter speeds (that is, different times of exposure of the pixels to light). Preferably, the imager 50 has a shutter 56 with shutter speeds in microseconds at seven levels of powers of two relative to each other, specifically, 1, 2, 4, 8, 16, 32, and 64 microseconds. The shutter 56 is electronic and exposes all the pixels of the array 54 at once. The imager 50 also has a controllable aperture 58.

The imager 50 supports the ability to read out (read the values for) selected pixels 53 only, rather than the entire array 54 of pixels. For example, the imager 50 supports the ability to read only one out of every three pixels 53, etc. The smaller number of pixels 53 is read out in a proportionately shorter time than it takes to read out the entire array 54 of pixels.

Figure 3:
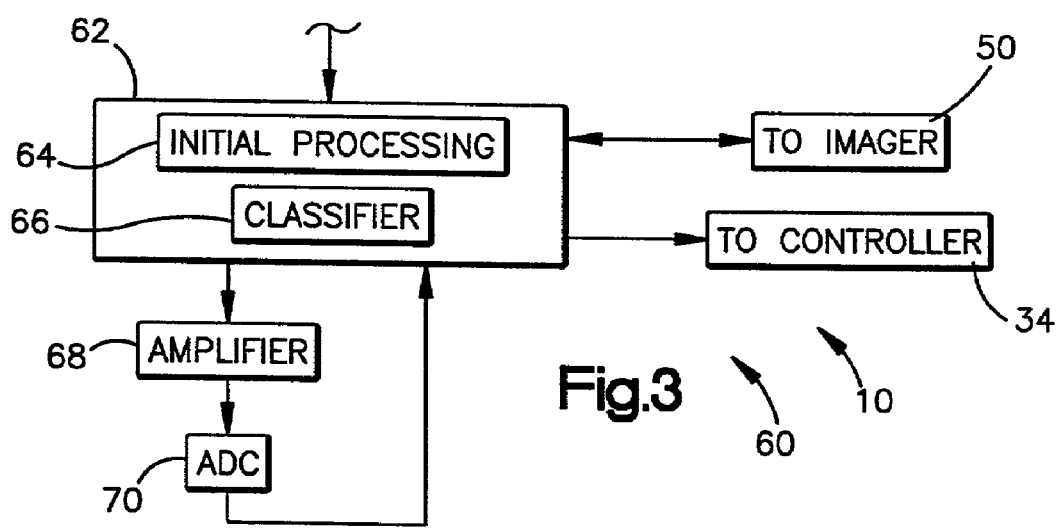
FIG. 3 is a block diagram of a portion of the image enhancement system of FIG. 1.

The occupant protection system 10 includes electric imaging circuitry shown schematically at 60 in FIG. 3. The imaging circuitry 60 includes image enhancement circuitry 62. The image enhancement circuitry 62 includes initial processing circuitry 64 and a classifier 66.

The initial processing circuitry 64 embodies a plurality of image enhancement techniques in one or more algorithms. The enhancement algorithm(s) identifies which regions of an image should be enhanced, and invokes the needed enhancement technique(s). The classifier 66 embodies a known image classification algorithm used to determine, for example, the presence and/or absence of an occupant on the vehicle seat 13. The image classification algorithm may, in addition, include the image enhancement algorithms of the initial processing circuitry 64.

The output of the image enhancement circuitry 62 is coupled to a programmable gain amplifier 68. The levels of gain of the amplifier 68 can be controlled in increments of a power of 2 over a range of 1 to 16. The circuitry also includes an analog-to-digital converter ("ADC") 70 that has a number of bits that is less than the imager bit depth. For example, in the illustrated embodiment, the imager 50 has a 12-bit depth at each pixel 53, and the ADC 70 is an 8-bit device. An 8-bit ADC is significantly less expensive than a 12-bit ADC. Therefore, it is desirable to use a relatively lower bit ADC whenever possible. The image enhancement techniques provided by the present invention make it possible to use a 12-bit imager 50 with an 8-bit ADC.

To determine the presence and/or position of an occupant (e.g., the occupant 14) the image sensor 50 acquires an image of the interior of the vehicle 12 when the illuminating element 46 is on. To improve the resolution of the image, and thereby enhance occupant detection, the image is subjected to one or more of a plurality of enhancement techniques as discussed below.

In general, there may be areas in the image that are excessively bright; areas that are excessively dim; or, areas in which it is unclear as to what is present. The present invention provides techniques, described below, for enhancing those images. Each technique is applicable to a particular one of these problem types.

FIG. 4 shows a flow chart of an exemplary process 100 in accordance with the present invention. The process 100 begins at step 102. The image sensor 50 acquires an initial image of the interior of the vehicle 12 under conditions of a predetermined nominal exposure and gain. The image is acquired while the illuminating element 46 is turned on to illuminate the area being imaged.

The process 100 proceeds to step 104 at which selected pixels 53 of the array 54 are read by the image enhancement circuitry 62, and specifically, the initial processing circuitry 64. All of the pixels 53 of the pixel array 54 can be read. Alternatively, as described below, only a decimated portion of the image (that is, only some of the pixels 53) can be read.

The pixel values that are obtained at step 104 are processed at step 106 by the image enhancement circuitry 62 to determine whether any regions of the image need enhancement. If it is determined at step 106 that no regions of the image need enhancement, the image is sent at step 108 to the classifier 66, at which the classification algorithm is applied. If it is determined at step 106 that at least one region of the image needs enhancement, one or more appropriate enhancement techniques are selected at step 110. The enhancement techniques are applied at step 112 to each such area.

A determination is then made at step 114 as to whether all the regions of the image that needed enhancement have been enhanced. If not, then the process loops back to step 112 at which the needed enhancement techniques are applied. If the determination at step 114 is positive, then the enhanced image is reassembled at step 116. The enhanced image is then sent at step 118 to the classifier 66.

The first enhancement technique, "decimation," involves reading out a decimated portion of the image, and analyzing that portion for certain features or characteristics—that is, to determining whether any regions of the image need to be enhanced. This can take less time than reading out the entire image and analyzing the entire image.

Although "decimated" literally means taking out one-tenth, in the present invention, the term is used herein to mean reading out only a selected portion of the image (some of the pixels 53 in the array 54), rather than the entire image (all of the pixels in the array). The selected pixels form a non-contiguous group of the pixels 53 of the array 54. The controller might read out every other pixel 53 from every other row; every third pixel for every third row, every fourth pixel from every fourth row, etc. For example, in FIG. 2, the pixels 53 that marked with an "X" may be read out, rather than reading every pixel in the array 54. As another example, one-tenth of the pixels 53 in the array 54 might be read out. (Note again that the number of pixels 53 in the array 54 will be substantially greater than is shown in FIG. 2, as FIG. 2 is only a schematic representation of a small portion of the array.)

The time needed to read out the selected pixels 53 is proportional to the number of pixels read. For example, when every third pixel 53 from every third row is read, the readout time is one-ninth of the readout time for the entire array 54. Similarly, the processing time is proportional to the number of pixels 53 read. For example, when every third pixel 53 from every third row is read, the processing time is one-ninth of the time it would take to process the readout values of the entire array 54.

The goal of this decimation strategy is to estimate rapidly the illumination levels across the entire array of pixels 54. This is done in order to rapidly identify regions of interest in certain regards. This work is done more efficiently and rapidly if decimated images are studied, rather than entire images.

By collecting and analyzing decimated images in this fashion, the overall image, and parts of it, can be characterized, in terms of brightness and motion, in a fraction of the time that would be required to analyze the entire image. In a process in accordance with the present invention, decimation would typically be the first step to determine the regions that need to be enhanced or are of interest.

A second technique, identified herein as "sub-windowing", involves, in general, reading out and analyzing a decimated image or a complete image, identifying regions with certain features or characteristics, and then treating those regions with one of the techniques listed below.

For example, the pixel array 54 shown schematically in FIG. 2 can be identified as having a region 130, bounded by the dot-dash line 132, that has many low pixel values, indicating a "dim" region. If this is found, this particular region, or "window", 130 can be treated with one or more of the techniques described below. This can be determined either through an analysis of the entire pixel array 54 or through a decimated portion of the array.

As another example, the pixel array shown schematically in FIG. 2 can be identified as having a region 134, bounded by the dot-dash line 136, that has many high pixel values, indicating a "bright" region. If this is found, this particular region, or "window", 136 can be treated with one or more of the techniques described below. Again, this can be determined either through an analysis of the entire pixel array 54 or through a decimated portion of the array.

As yet another example, it is known to identify motion in an area by comparing two or more successive images of the area and identifying regions in which there is significant change in pixel charge values between successive images. Such regions would be construed as having motion in them. To identify motion in an efficient manner, the present invention compares two or more successive decimated images. The identification of regions in which there is significant change in pixel charge values between successive images is more efficient and rapid when decimated images are compared, rather than entire images.

This process is illustrated schematically at 140 in FIG. 5. In the process 140, an image is taken at step 142. Selected pixels of the image are read out at step 144. A second image is taken at step 146. Selected pixels of the second image are read out at step 148. The selected pixels from the first image are compared with the selected pixels from the second image at step 150, to determine the existence of motion.

A third image enhancement technique involves varying the gain of the amplifier 68. As noted above, the dynamic range of the imager 50, 12 bits, exceeds that of the ADC 70, which is 8 bits. By this programmable gain technique, the 8-bit range of the ADC 70 is "matched" to the 12-bit image provided by the imager 50.

Specifically, the image is analyzed to determine where the desired information resides—at one end or the other of the 12 bit range, or in the middle. This process is illustrated schematically at 152 in FIG. 6. In the process 152, an image is taken at step 154. All or selected pixels 53 of the image are read out at step 156.

If all or substantially all of the pixels 53 have values that lie within the lower 8 bits (out of 12) of the dynamic range of the imager 50, a higher gain setting is used at step 158 for the amplifier 68. This might be the case where a region of the image, or the image as a whole, is identified by pixel values as being excessively "dim".

If all or substantially all of the pixels 53 have values that lie within the upper 8 bits (out of 12) of the dynamic range of the imager 50, a lower gain setting is used at step 158 for the amplifier 68. This might be the case where a region of the image, or the image as a whole, is identified by pixel values as being excessively "bright".

If the image lies within the central 8 bits (out of 12) of the dynamic range of the imager 50, an intermediate gain setting is used at step 158 for the amplifier 68.

This technique can be used on sub-windows (specific areas of the image), or on the image as a whole, to match some or all of the image information provided by the imager 50 to the more limited range ADC 70. In this manner, a limited (8 bit) ADC can be used to recover more of the dynamic range and resolution available in the imager.

Increasing resolution for such areas of extreme brightness and extreme darkness can, however, be accomplished by the application of the following technique related to shutter speed.

A fourth image enhancement technique of the present invention involves controlling shutter time, or exposure duration, to control the amount of light that impinges on the pixel array 54. This strategy of changing exposure time can effectively expand the dynamic range of the imager 50, by shifting its range up or down via exposure control.

As noted above, the imager 50 has a controllable shutter 56 with different shutter speeds (that is, different times of exposure of the pixels 53 to light). The imager 50 also has a controllable aperture 58. In this technique, the aperture 58 of the imager 50 is first set so that the brightest possible image will just saturate the charge of an exposed pixel 53 with one microsecond of exposure. Then, the shutter 56 is set to provide an exposure of a nominal time of 8 microseconds, and an image is taken.

The decimation technique described above is then used to read out portions or all of the image. The image portion is studied to determine whether a different exposure time would be suitable for the image portion.

This process is illustrated schematically at 160 in FIG. 7. In the process 160, an image is taken at step 162. Selected pixels 53 of the image are read out and analyzed at step 164. On the basis of the analysis, the speed of the shutter 56 of the imager 50 is set at step 166, and another image is taken at step 168.

For example, if one particular portion of the image has a significant fraction of its pixel values in the upper four bits of the ADC's dynamic range (is excessively bright), the shutter time is shortened from the nominal value to, for example, two microseconds, and the image or image portion is then exposed again and read out again.

With this change of exposure time, pixel values that initially had high values are shifted to lower values. Pixel values that were in the top 4 bits of the ADC range now appear in the lower 4 bits. Some or all pixels that were in charge saturation now drop out of saturation and produce values in the upper 4 bits of the 8 bit ADC range. At this point, the image portion may be more easily classified.

As another example, if at the highest gain setting one particular region of the image has a significant fraction of its pixel values in the lower four bits of the ADC's dynamic range, the shutter time is increased from the nominal value to, for example, 32 microseconds, and the image or image region is then exposed again and read out again.

With this change of exposure time, pixels that initially had low values are shifted to higher values. Pixel values that were in the lower 4 bits of the ADC range now appear in the upper 4 bits. Some or all pixels that were completely dark now may have usable information, and produce values in the lower 4 bits of the 8 bit ADC range. At this point, the image portion may be more easily classified.

This strategy of changing exposure time thus effectively expands the dynamic range of the imager 50, by shifting its range up or down via exposure control. The imager 50 still has only 12 bits of resolution, and the ADC 70 still has only 8 bits, but the scale over which these are applied can be shifted either up or down, adding to the dynamic range of the system.

In an alternative process, an image that has once been sent to a classifier 66 may produce an indeterminate outcome, if the classification algorithm makes its classification decision under conditions of nominal exposure and gain. The algorithm may be unable to determine, for example, the presence or absence of an occupant on the vehicle seat 13. In this case, one or more enhancement techniques may be applied to one or more portions of the image, and the enhanced image may then be sent back through the algorithm.

This process is illustrated schematically at 170 in FIG. 8. In the process 170, an image is taken at step 172. The classification algorithm is applied to the image at step 174, and a determination is made at step 176 as to whether the image presents recognizable information. If so, the output of the classifier 66 is sent to the controller 34 at step 178, to aid in making a determination as to whether the inflator should be enabled.

If the image does not present recognizable information at step 176, then the process proceeds to step 180, at which one or more enhancement techniques are applied to the image. The classification algorithm is again applied to the enhanced image at step 182.

As another alternative process, if an image that has once been sent to the classifier 66 produces an indeterminate outcome, a second (subsequent in time) image is taken, with one or more enhancement techniques applied. The enhancement techniques are applied to control the imager 50 before the taking of the second image, to control in one or more respects how the image is taken. The enhanced second image is then sent back through the classification algorithm.

This process is illustrated schematically at 184 in FIG. 9. In the process 184, an image is taken at step 186. The classification algorithm is applied to the image at step 188, and a determination is made at step 190 as to whether the image presents recognizable information. If so, the output of the classifier 66 is sent to the controller 34 at step 192, to aid in making a determination as to whether the inflator should be enabled.

If the image does not present recognizable information at step 190, then the process proceeds to step 192, at which a second image is taken, using one or more enhancement techniques as determined to be appropriate by the classification algorithm.

As a further alternative process, if an image that has once been sent to the classifier 66 produces an indeterminate outcome, a second (subsequent in time) image is taken, with one or more enhancement techniques applied to one or more portions of the image after the taking of the second image. The enhanced second image is then sent back through the classification algorithm.

This process is illustrated schematically at 196 in FIG. 10. In the process 196, an image is taken at step 198. The classification algorithm is applied to the image at step 200, and a determination is made at step 202 as to whether the image presents recognizable information. If so, the output of the classifier 66 is sent to the controller 34 at step 204, to aid in making a determination as to whether the air bag inflator should be enabled.

If the image does not present recognizable information at Step 202, then the process proceeds to step 206, at which a second image is taken. The second image is then enhanced at step 208, using one or more enhancement techniques as determined to be appropriate by the classification algorithm from the study of the first image. The classification algorithm is applied to the enhanced second image at step 210.

From the above description of the invention, those skilled in the art will perceive improvements, changes and modifications in the invention. Such improvements, changes and modifications within the skill of the art are intended to be covered by the appended claims.

We claim:

1. A method for helping to control a vehicle occupant protection device, said method comprising the steps of:

taking an image of the vehicle interior with a digital imager having an array of pixels;

selecting a contiguous portion of the image that is less than the entire image;

applying at least one image enhancement technique to the selected portion of the image;

combining the enhanced image portion with the other portions of the image to make an enhanced image; and analyzing the enhanced image to detect at least one of features and characteristics of the enhanced image.

2. A method as set forth in claim 1 wherein said selecting step includes selecting an image portion having an undesired level of brightness and said applying step includes the step of retaking the selected image portion at a different shutter speed to make an enhanced image portion having a different level of brightness.

3. A method as set forth in claim 1 wherein said selecting step includes selecting an image portion having an undesired level of brightness and said applying step includes the step of passing the image through a variable gain amplifier to vary the brightness of the selected image portion.

4. A method as set forth in claim 3 wherein said step of taking an image includes taking an image with an imager having a first bit range, said analyzing step includes passing the image through an ADC having a second bit range less than the first bit range of the imager, said selecting step includes the step of selecting an image portion having its significant bits in the lower range of the bit range of the ADC, and said applying step includes the step of amplifying the selected image portion to raise the significant bits of the image to a higher portion of the bit range of the ADC.

5. A method as set forth in claim 1 wherein said step of analyzing the enhanced image includes the step of reading out all the pixels of the imager and analyzing the entire image.

6. A method as set forth in claim 1 wherein said step of analyzing the enhanced image includes the steps of reading out a selected non-contiguous group of the pixels of the imager and analyzing the image as represented by only the selected non-contiguous group of pixels.

7. A method as set forth in claim 6 wherein the selected group of pixels comprises predetermined pixels selected from predetermined rows of the pixel array of the imager.

8. A method for helping to control a vehicle occupant protection device, said method comprising the steps of:

taking an image of the vehicle interior with a digital imager having an array of pixels;

reading out a selected non-contiguous group of the pixels of the imager that are representative of the entire image, to estimate the illumination levels across the entire array of pixels;

analyzing the image to detect at least one of features and characteristics of the image; and controlling operation of the vehicle occupant protection device on the basis of the image analysis.

9. A method as set forth in claim 8 further including the steps of preliminarily analyzing the entire image as represented by the selected group of pixels after performing said reading step and before performing said analyzing step, and enhancing one or more portions of the image to make an enhanced image on the basis of the preliminary analysis, and wherein said step of analyzing the image to detect at least one of features and characteristics of the image includes analyzing the enhanced image.

10. A method as set forth in claim 8 including the steps of:

taking a second image of the vehicle interior with the a digital imager;

reading out a selected non-contiguous group of the pixels of the imager that are representative of the entire second, image to estimate the illumination levels across the entire array of pixels; and comparing the selected group of pixels from the first image to the selected group of pixels of the second, image to detect motion in the vehicle interior.

11. A method as set forth in claim 8 further comprising the steps of changing the shutter speed of the imager on the basis of the estimated illumination levels, and taking a second image of the vehicle interior with the changed shutter speed.

12. A method as set forth in claim 8 further comprising the steps of passing the image through an amplifier, and varying the gain of the amplifier on the basis of the estimated illumination levels.

13. A method for helping to control a vehicle occupant protection device, said method comprising the steps of:

taking a first image of the vehicle interior with a digital imager having an array of pixels and set at a first shutter speed;

reading out at least a portion of the pixels of the imager to determine illumination levels of the image;

changing the shutter speed of the imager from the first shutter speed to a second shutter speed;

taking a second image of the vehicle interior with the digital imager set at a second shutter speed;

analyzing the second image to detect at least one of features and characteristics of the image; and controlling operation of the vehicle occupant protection device on the basis of the image analysis.

14. A method as set forth in claim 13 wherein said step of reading out at least a portion of the pixels of the imager to determine illumination levels of the image, includes reading out a selected non-contiguous group of the pixels of the imager that are representative of the entire image, to estimate illumination levels across the entire array of pixels.

15. A method as set forth in claim 14 wherein said step of reading out at least a portion of the pixels of the imager to determine illumination levels of the image, includes selecting a contiguous portion of the image that is less than the entire image, applying one or more image enhancement techniques to the selected portion of the image to enhance the selected image portion;

combining the enhanced selected image portion with the other portions of the image to make an enhanced image; and analyzing the enhanced image to detect features and/or characteristics of the enhanced image.

\* \* \* \* \*

UNITED STATES PATENT AND TRADEMARK OFFICE
CERTIFICATE OF CORRECTION

PATENT NO. : 7,123,747 B2 Page 1 of 1
APPLICATION NO. : 10/156592
DATED : October 17, 2006
INVENTOR(S) : Jon K. Wallace It is certified that error appears in the above-identified patent and that said Letters Patent is hereby corrected as shown below:

Column 10, line 29, after "second" delete --,--.

Column 10, line 33, after "second" delete --,--.

Signed and Sealed this

Twenty-seventh Day of March, 2007

JON W. DUDAS
*Director of the United States Patent and Trademark Office*